June 2, 1959  K. A. TEUMER  2,888,806
CONTROL SYSTEM
Filed March 16, 1955  2 Sheets-Sheet 1
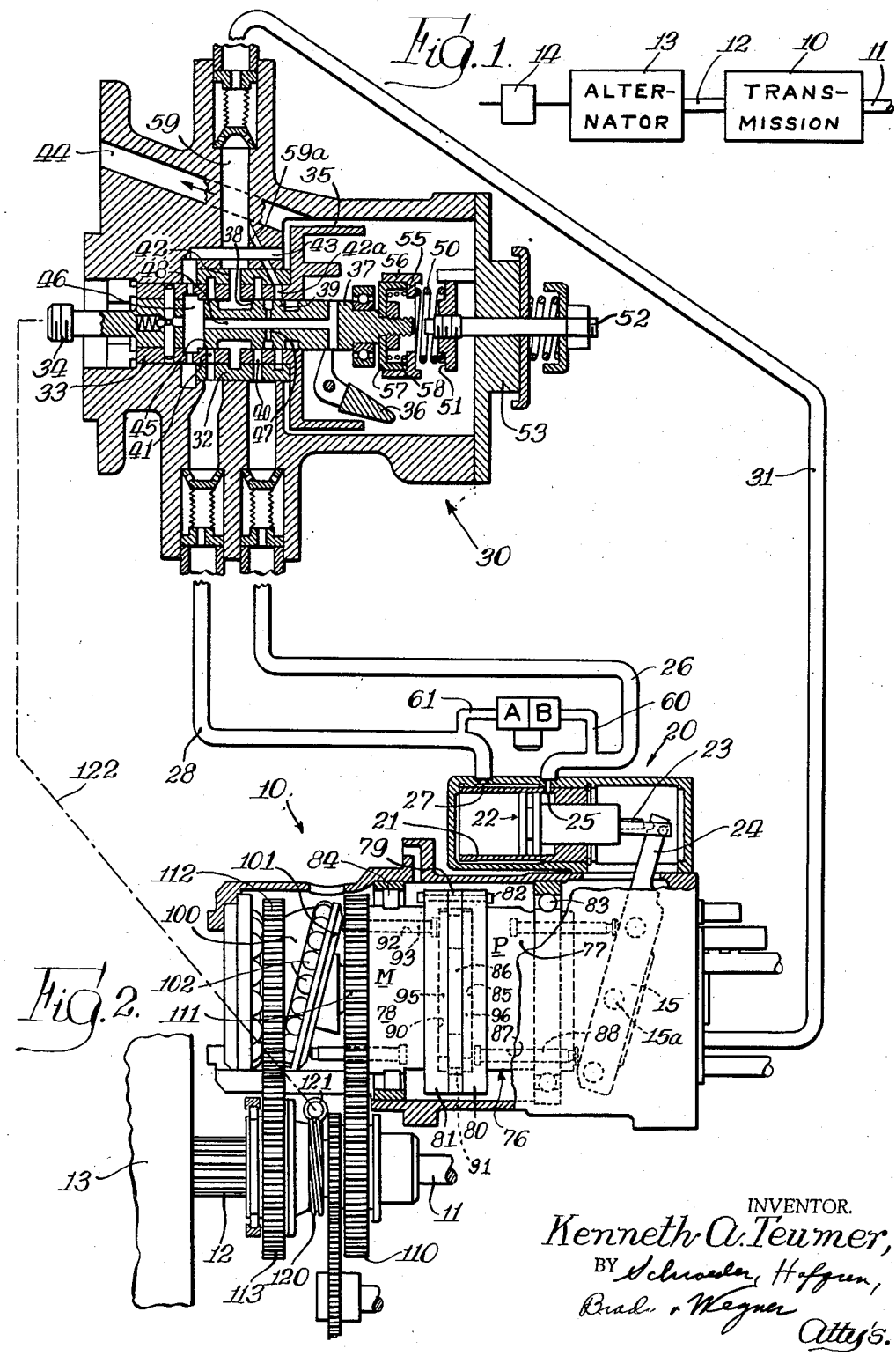

June 2, 1959  K. A. TEUMER  2,888,806
CONTROL SYSTEM
Filed March 16, 1955  2 Sheets-Sheet 2
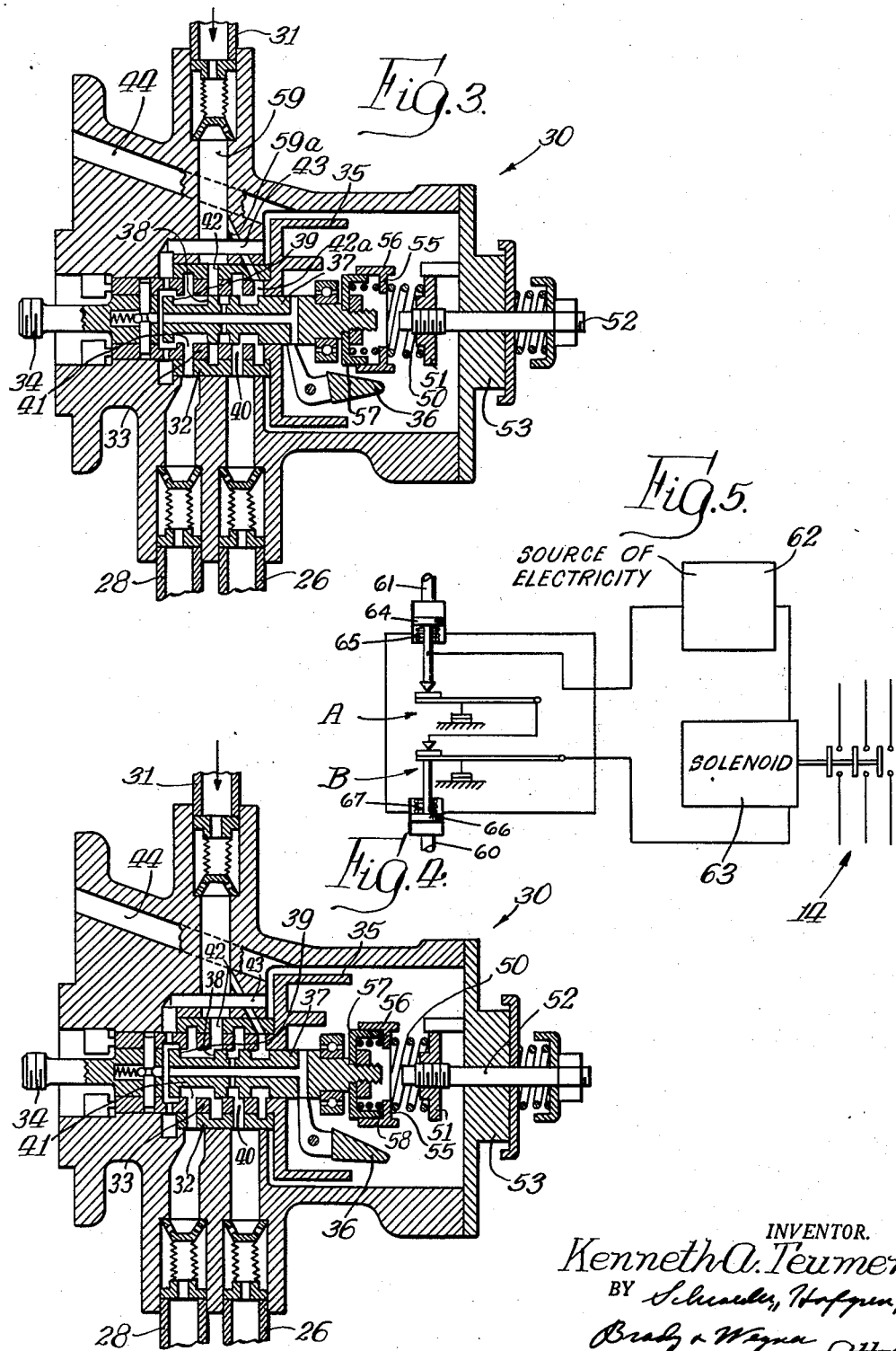
INVENTOR.
Kenneth A. Teumer,
BY Schroeder, Hofgren,
Brady & Wegner
Attys.

United States Patent Office 2,888,806
Patented June 2, 1959

2,888,806
CONTROL SYSTEM

Kenneth A. Teumer, Rockford, Ill., assignor to Sundstrand Machine Tool Co., a corporation of Illinois Application March 16, 1955, Serial No. 494,798

5 Claims. (Cl. 60—53)

This invention relates to a control system and more particularly to a governor type control particularly usable to control a hydraulic transmission.

It is the general object of the present invention to produce a new and improved control.

It is a more specific object of the invention to produce a control particularly sensitive to operations of a transmission at speeds other than normal speeds and operable in response to abnormal speeds.

It is a more specific object of the invention to produce a control which will "fail safe" in the event of misfunction.

It is yet another object of the invention to produce a governor type speed control provided not only with the normal speeder spring opposing the action of rotating flyweights, but also with an auxiliary spring, weaker than the speeder spring, but operable to move the governor control member to a position slowing the speed of the device controlled by the governor in the event the flyweights for any reason cease rotating.

A further object of the invention is to provide a control system for engaging a transmission driven device with a load when optimum operating speeds have been achieved and the transmission is under complete control.

Yet another object of the invention is to produce a control of the type described in the preceding paragrph wherein the speed of said transmission is controlled by opposed fluid pressures and the means for engaging the transmission with a load include devices sensitive to both of said control pressures and operating to engage the transmission with the load only upon the existence and maintenance of a predetermined minimum pressure in said control pressures.

Other and further objects and advantages of the invention will be readily apparent from the following description and drawings in which;

Figure 1 is a diagrammatic view showing the type of system where the control is best suitable for use;

Fig. 2 is a side elevational view partly in section showing a transmission and control therefor, together with a governor for the control and constructed in accordance with the present invention;

Fig. 3 is a vertical sectional view through the governor and showing the parts thereof in the position attained upon start-up;

Fig. 4 is a view like Fig. 3 but showing the parts of the governor in the positions attained after start-up but before reaching optimum operating speed; and Fig. 5 is a schematic diagram showing the electrical circuit controlled in part by the governor.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

While it will be obvious to those skilled in the art that many of the aspects of the present invention have a wide application, they are particularly usable in conjunction with an alternator drive and control therefor of the type generally shown in the application of Carl Sadler et al. filed December 4, 1951 and bearing Serial No. 259,872, now Patent No. 2,803,112. As shown in that application and as indicated diagrammatically in Fig. 1, the general overall system may include a hydraulic transmission 10 driven by a drive shaft 11 and driving in turn a driven shaft 12 connected to an alternator generator 13 which may be cut into an electrical system by means of a switch 14.

The hydraulic transmission 10 may include a variable volume piston pump whose displacement is controlled by a wobbler 15, pivotally mounted at 15a, with the output of the pump being directed to a fixed displacement hydraulic motor which is rotated thereby. In normal use it is contemplated that the drive shaft 1 will be driven from the engine of an aircraft at a great number of speeds and it is the function of the transmission 10 to convert the variable input speeds into a constant output speed so that the alternator generator 13 may produce an electrical current of desired predetermined frequency.

As best seen in Fig. 2 the transmission includes a hydraulic power and speed conversion unit, which unit in turn is comprised of a pump P and a motor M, each of the reciprocatory piston type, with the pump having the wobbler 15 adjustable in varying amounts to either side of neutral position to vary the direction as well as the quantity of fluid discharged from the pump to the motor. The hydraulic transmission 10 as here shown is of the rotatable barrel or cylinder block type, and has the pump as well as the motor cylinders formed in the same rotatable cylinder block 76. Such a construction permits of readily obtaining rotation of the motor shaft at a speed either above or below that of the cylinder block, and hence of obtaining the constant speed of the motor shaft regardless of the rate of rotation of the cylinder block by adjustment of the wobbler 15. Adjustment of the wobbler 15 with respect to neutral determines whether the motor shaft is driven faster or slower than the cylinder block 76 and the extent that the wobbler 15 is swung from its neutral position determines the differential between the speeds of the cylinder block and the motor shaft, the pump and motor parts being locked and the cylinder block and the motor shaft rotating at the same speed when the wobbler is in neutral position.

The rotatable cylinder block 76 comprises a pump block 77, a motor block 78 and an annular spacer plate 79. The pump and motor blocks are assembled in line so as to maintain the outside diameter of the cylinder block 76 to a minimum, adapting the unit for high speed operation in which centrifugal forces are kept at a minimum. The pump and motor blocks are secured in end to end relationship, being spaced only by the plate 79. To that end, the blocks 77 and 78 are formed repectively with radially outwardly extending flanges 80 and 81 and passing through these flanges and through the plate 79 are a plurality of bolts 82 by means of which the parts are secured together in fluid-tight relationship.

The cylinder block 76 is rotatably supported in two sets of bearings 83 and 84.

The face of the pump block 77 adjacent the plate 79 is formed with a shallow circular recess 85 which with the plate 79 forms a valve chamber 86 at all times in free communication with a chamber 86 formed by the center of the annular plate 79. Also formed in the block 77 is a plurality of annularly arranged cylinders 87 disposed in parallel relationship with the axis of the unit and opening at the right-hand end as seen in Fig. 2 through the end of the block 77 and opening at the left-hand end to the valve chamber 85. The number of cylinders 87 is large, being in the order of eighteen. Reciprocable in each cylinder 87 is a piston 88 and operable to project in all positions from the right-hand end of the cylinder and in contact with the face of the wobbler 15.

Formed in the corresponding face of the motor block 78 is a shallow, circular recess 90 similar to the recess 85 and likewise forming with the plate 79 a valve chamber in constant communication with the chamber 86. The valve chambers 85 and 90 in addition to being in communication through the chamber 86 are in communication at their peripheries through a plurality of longitudinal passages 91 formed in the plate 79. Also formed in the motor block 78 is a plurality of annularly arranged cylinders 92 disposed parallel with the axis of the transmission unit and opening at one end through the left-hand end of the block 78 and at the other end opening to the valve chamber 90. Reciprocable in each cylinder 92 is a piston 93 which is operable in all positions to project from the left-hand end of the block 78. The motor cylinders, in the embodiment illustrated, correspond in number to the pump cylinders.

Operable in the valve chambers 85 and 90 are identical valves 95 and 96 of the wheel type described in Wahlmark Patent No. 2,474,706. Each valve is composed of a rim of radial width equal to the diameter of the cylinders, which rim has a close, fluid-tight but sliding fit between the end walls of the valve chamber in which it is located. The rim is connected to and carried by a hub through the medium of spokes which are spaced sufficiently apart so as to leave a plurality of openings through the valve and which also are of reduced thickness compared to the rim in order to permit a ready flow of fluid from one side of the valve to the other as well as circumferentially.

The valves 95 and 96 have a gyratory, as distinguished from a rotary, movement within the valve chamber, serving by such gyratory movement to connect the cylinders in rotational sequence alternately to the periphery of the respective valve chambers outwardly of the rim and to the chambers inwardly of the rim, the cylinders being completely closed at the time of reversal of the direction of movement of the corresponding piston. To impart such gyratory movement to the valve relative to the valve chambers the valves are given an eccentric mounting.

Completing the motor is a swash plate 100 comprising an outer annular member 101 positioned for constant engagement with the left-hand projecting ends of the motor pistons 93. The annular member 101 is carried by a plurality of thrust ball bearings 102.

It is believed apparent from the foregoing that the cylinder block 76 constitutes the driving part of the hydraulic transmission.

For rotating the cylinder block there is secured to the drive shaft 11 a spur gear 110 having teeth meshing with the teeth of a second spur gear 111 fixed to the cylinder block 76. The swash plate 100 carries thereon a gear 112 which meshes with a second gear 113 fixed to a drive shaft 12 for driving the alternator 13. Fixed upon the shaft 12 is a worm gear 120 which meshes with a worm 121 which through a right angle bevel gear system diagrammatically illustrated by the dashed line 122 serves to rotate the flyweights of a centrifugal governor 30 which forms a part of the control system of this invention.

Thus, as the drive shaft 11 is rotated, the cylinder block 76 is rotated through the medium of gears 110, 111. If the control device 15 is in neutral (vertical) position, the pump pistons 87 do not reciprocate thereby preventing the motor pistons 93 from reciprocating as the latter pistons bear against the face 101 of the swash plate, the swash plate is thereupon rotated at the same speed as the motor block and through the medium of gears 112 and 113 drives the output shaft at the same speed as the input shaft. When the wobbler 15 is moved away from the neutral position toward the position shown in Fig. 2, the pump pistons are caused to reciprocate thereby pumping fluid into the motor reciprocating the motor pistons. This reciprocation of the motor pistons, pushing outwardly against the inclined face 101 of the swash plate, serves to rotate the swash plate at a speed faster than the rate of rotation of the cylinder block. On the other hand, if the wobbler is moved counterclockwise from the position shown in Fig. 2 to beyond neutral position, the pump pistons are again caused to reciprocate but are in effect 180° out of phase with the motor pistons thereby causing the motor pistons to reciprocate in a manner permitting the swash plate to rotate at a speed less than the rotation of the cylinder block. At all input speeds, however, rotation of the cylinder block and hence the output shaft occurs.

As previously noted, the output of the transmission depends upon the position of the wobbler 15 and for the purpose of tilting the wobbler, there is provided a hydraulic control device 20 including a cylinder 21 and a compound piston 22 reciprocable therein. The piston is connected by means of arms 23 to a lever 24 secured to the wobbler so that movement of the piston 22 in its cylinder 21 will be effective to cause the wobbler 15 to change its position. Hydraulic control fluid under pressure is introduced into the cylinder 21 on one side of the piston 22 through a port 25 which is in communication with a fluid passage 26 and control fluid is introduced into the cylinder 21 on the opposite side of the cylinder 22 by means of port 27 and passage 28. Shifts in position of the piston 22 within the cylinder 21 are accomplished by varying the control fluid pressures existing in the passages 26 and 28 and such variations in control fluid pressure are provided through the medium of a governor device 30. As best seen in Fig. 3, the governor 30 is provided with movable valve means for controlling and distributing hydraulic control fluid under pressure from a passage 31 connected to a source of fluid under pressure to the passages 26 and 28. For this purpose the governor is provided with a ported fixed sleeve 32 rotatably carrying a ported rotatable sleeve 33 driven by means of a shaft 34 coupled to the driven shaft 12, (through the medium of the gear means 120—122), and thus rotatable at a speed proportional to the driven shaft. The rotatable sleeve 33 is formed at one end into a cup shaped portion 35 carrying a plurality of flyweights 36 pivotally connected thereto and contacting at their inner ends a slidable control valve or control member 37. The control valve 37 is provided with lands 38 and 39 controlling ports 40 and 41 communicating with the passages 26 and 28, respectively, through the sleeves and also controlling ports 42 and 43 connected respectively to the source 31 of fluid pressure and to a drain passage 44.

Rotation of the driven shaft 12 causes rotation of the sleeve 33 and as the rotation increases in speed, the flyweights 36 pivot outwardly thereby moving the control member 37 to the right (as seen in Fig. 4) and such rightward movement of the control member is opposed by a speeder spring 50 seated upon a seat 51 adjustably mounted within the governor casing. For the purpose of regulating the speeder spring the seat 51 is mounted upon a rod 52 in turn adjustably positioned in the head portion 53 of the governor casing.

It will be noted from the foregoing description that on start-up the valve is in the position shown in Fig. 3 wherein the passage 28 is connected to drain while passage 26 is connected to control fluid under pressure thereby moving the wobbler to underdrive position. As the speed of the input shaft 11 increases, the speed of rotation of the shaft 34 similarly increases causing the flyweights 36 to be subjected to centrifugal force which is transmitted to the valve stem and urges the valve stem to the right toward the position of Fig. 4. The springs, however, are sufficient to resist this movement of the valve stem and maintain the wobbler in underdrive position until the input shaft reaches a predetermined value, for example, 1800 RPM. At this speed the centrifugal force exerted by the flyweights is sufficient to move the valve stem to the position of Fig. 4 wherein passage 26 is connected to drain while passage 28 is connected to control pressure. This moves the wobbler to maximum overdrive position thereby rapidly accelerating the output of the transmission to put it up toward normal operating speed. At 2400 RPM input speed the governor system assumes the position of Fig. 2 which is normal governing operation and further shifts of the valve stem in response to the opposing forces of flyweights and springs serve to maintain the output speed of the transmission at a substantially constant value.

It can readily be seen that should there occur a failure in the driving connection between the driven shaft 12 and the rotatable sleeve 33 so that the sleeve ceased rotation, the speeder spring 50 would move the transmission into maximum overdrive position (the position of Fig. 4) and cause the drive to speed to destruction. To prevent the occurrence of such overspeeding in the event of partial governor failure, an additional or auxiliary spring is provided to move the control valve 37 beyond the position calling for maximum overdrive position (the position it would otherwise be moved into by the speeder spring). The auxiliary spring serves to move the control valve to a position porting overdrive pressure (pressure in passage 28) to drain and directing fluid pressure into the passage 26 to move the wobbler into maximum underdrive position.

Referring again to Figs. 2–4, it will be noted that the other end of the speeder spring 50 rests upon a seat 55 formed on a surface of a collar-like element 56 which is telescoped over a second collar-like element 57 secured to one end of the control member 37. Compressed between the telescoping members 56 and 57 is an auxiliary spring 58 which is weaker than the speeder spring 50 but which performs the function of moving the valve in a manner to cause the wobbler to move to maximum underdrive position should there be a failure in the governor drive system. It will be noted that the source 31 of fluid pressure connects with a passage 59 which in turn connects with the port 42 and that there is provided a branch passage 59a opening at one end to the passage 59 and on the other end to an annular groove 42a in the rotatable sleeve.

Fig. 3 illustrates the position of the various parts of the governor when the transmission is at rest. It will be noted that fluid under pressure is directed into the passage 26 by means of passage 59, 59a, groove 42a, and port 40. The passage 28 is connected to drain through the ports 41 and passage 43. Both the speeder spring 50 and the auxiliary spring 58 are extended and the telescoping members 56 and 57 are at their maximum separation.

As previously noted, the various positions of the parts of the governor just described and illustrated in Fig. 3 are those to be found on the transmission and drive as being initially started. It will be recognized that the parts attain a similar position should the flyweights at any time fail to operate as through a breakage of the shaft 34. Thus, should there be a failure of the shaft (or other part of the flyweight rotating mechanism) during operation, the transmission will be moved to full underdrive position by reason of the auxiliary spring 58.

As the driving element (for example, the aircraft engine) accelerates in speed, the flyweights will rotate at a higher speed until they reach the position of Fig. 4. In this position the passage 26 is connected to drain while the passage 28 is connected to the high pressure and thus serves to move the piston 22 rightwardly in its cylinder to move the wobbler to maximum overdrive position. The drive and governor will continue to accelerate until proper operating speeds are attained, the auxiliary spring 58 is fully compressed and the members 56 and 57 are physically in contact, at which time control is completely divided between the flyweights 36 and speeder spring 50 and the governor is in the position illustrated in Fig. 2. In the particular drive chosen for illustration, the condition of Fig. 3 obtains while the input shaft 11 goes from zero to approximately 1800 r.p.m.'s. At approximately 1800 r.p.m. input speed the speed of the output shaft 12 has been increased to a point where the sleeve 33 and flyweights 36 are rotating rapidly enough to overcome the bias of the spring 58 thereby moving the valve 37 to the position shown in Fig. 4. With the governor in this position, the transmission is shifted into full overdrive until approximately 2400 r.p.m. input speed of the shaft 11 is reached. At this input speed the flyweights will be rotating at a speed sufficient to move the control valve to the position shown in Fig. 2, which is normal governing position. At this time normal governing operation begins and control valve lands 38 and 39 port the proper pressure to ports 40 and 41 to position the piston 22 at various positions in cylinder 21 as may be necessary to provide a constant transmission output speed.

With the valve 37 in the position shown in Fig. 2 the lands 38 and end land 45 block off control pressure from the ports 40 and 41 and the position of the control piston 22 is fixed against movement. A slight increase in the rotational speed of the flyweights 36 will cause them to move the control valve 37 to the right whereby the land 38 is moved to permit communication between the pressure port 42 and the port 40. Simultaneously, the end land 45 is moved to permit communication between the port 41 and the drain passage 46. Such repositioning of the valve 37 will cause leftward movement of the piston 22 thereby reducing the output speed of the transmission. Similarly, should the output speed drop below the desired value, the resulting reduced rate of rotation of the flyweights will permit the speeder spring 50 to move the valve member 37 to the left of the position shown in Fig. 1 connecting the port 41 with the pressure and the port 40 to drain through the passages 47 and 48. This will result in rightward movement of the piston 22 increasing the transmission output.

In the exemplary embodiment of the invention illustrated, it has been pointed out that the transmission there shown may be employed to drive an alternating current generator and when so employed, it is desirable that the alternator be not cut into the electrical system until proper operating speed of the transmission has been reached. As previously indicated, the normal operating speed of the transmission is in the neighborhood of 2400 r.p.m.

It will be noted that the governor previously described is so arranged as to provide fluid pressure only in the passage 26 when the input speed is 1800 r.p.m. or less and to provide fluid pressure only in the passage 28 until the input speed exceeds 2400 r.p.m. From the foregoing it is clear that proper operating speeds are indicated by the fact that pressures exist in the passages 26 and 28 and the existence of such pressures is utilized to cut the alternator 13 into the general electrical circuit. For this purpose pressure responsive switches A and B are provided with switch B being connected to the passage 26 by means of conduit 60 and switch A being connected to the passage 28 by conduit 61. As illustrated in Fig. 5, switches A and B are closed when a predetermined pressure has been created in the respective passages 61 and 60. Passage 61 is connected to a hydraulic piston and cylinder device 64 for closing the switch A, there being a spring 65 acting in opposition to the device 64 to open the switch A when pressure drops in the passage 61. Similarly, pressure in the passage 60 operates the hydraulic piston and cylinder device 66 to close the switch B in opposition to the spring 67, which will open the switch when the pressure drops in the passage 60. Closing of both of said switches serves to complete a circuit between a source of current 62 and a solenoid 63 connected to operate the switch 14. It will also be clear that should there by a governor drive failure during operation of the transmission so as to cause the valve member 37 to assume the position of Fig. 3, then the resulting drop of pressure in the passage 28 will cause the pressure switch to open thereby breaking the circuit to the solenoid 63, opening the switch 14, and cutting the alternator 13 out of the electrical circuit.

I claim:

1. A control system for a hydraulic transmission having an input member and an output member comprising a centrifugal governor, a casing provided with a plurality of control fluid passages including a drain passage and a pressure passage, a source of fluid under pressure connected to said pressure passage, a control member movable in the casing selectively to control the flow of fluid from said pressure passage to the other passages, a rotatably mounted flyweight in the governor driven by the output member of the transmission and connected to the control member, said flyweight being operable to move the control member in one direction in response to increases in speed of the output member, a speeder spring opposing movement of the control member in said direction and biasing the control member toward movement in the other direction to a predetermined position connecting one of said passages to said pressure passage, an auxiliary spring operating in series with the speeder spring for moving the control member in said other direction and beyond said predetermined position to a different position connecting said one passage to the drain passage to drop the fluid pressure therein, and means sensitive to the pressure in said one passage and operable upon said drop in the pressure therein to disengage the transmission from a load.

2. A control system for a hydraulic transmission having an input member, an output member and hydraulically operated means for varying the speed of the output member relative to the input member comprising a centrifugal governor, a casing provided with a plurality of control fluid passages including a drain passage, a motor passage and a pressure passage, a source of fluid under pressure connected to said pressure passage, a control member movable in the casing selectively to control the flow of fluid from said pressure passage to the other passages, a rotatably mounted flyweight in the governor driven by the output member of the transmission and connected to the control member, said flyweight being operable to move the control member in one direction in response to increases in speed of the output member, a speeder spring opposing movement of the control member in said direction and biasing the control member toward movement in the other direction to a predetermined position connecting the motor passage to the pressure passage, an auxiliary spring operating in series with the speeder spring for moving the control member in said other direction and beyond said predetermined position to a different position connecting said motor passage to the drain passage, and means connecting the motor passage to said hydraulically operated speed varying means.

3. A control system for a hydraulic transmission having an input member, an output member and hydraulically operated means for varying the speed of the output member relative to the input member comprising a centrifugal governor, a casing provided with a plurality of control fluid passages including a drain passage, a motor passage and a pressure passage, a source of fluid under pressure connected to said pressure passage, a control member movable in the casing selectively to control the flow of fluid from said pressure passage to the other passages, a rotatably mounted flyweight in the governor driven by the output member of the transmission and connected to the control member, said flyweight being operable to move the control member in one direction in response to increases in speed of the output member, a speeder spring seated at one end in the casing with its axis parallel to and aligned with the axis of rotation of the flyweight, means connecting the speeder spring to the control member to oppose movement of the control member in said direction and biasing the control member toward movement in the other direction to a predetermined position connecting the motor passage to the pressure passage, said connecting means including a pair of telescoping elements, one secured to the control member and the other to the other end of the speeder spring, an auxiliary spring weaker than the speeder spring compressed between said elements and urging them apart, said auxiliary spring being effective to move the control member in said other direction and beyond said predetermined position to a different position connecting said motor passage to the drain passage, and means connecting the motor passage to said hydraulically operated speed varying means.

4. A control system for a hydraulic transmission having an input member, an output member and a hydraulically operated piston and cylinder device for varying the speed of the output member relative to the input member comprising a centrifugal governor, a casing provided with a plurality of control fluid passages including a drain passage, a first and a second motor passage, and a pressure passage, with the first motor passage being connected to one end of said cylinder to move the piston in a direction decreasing the speed of the output member relative to the input member and with the second motor passage being connected to the opposite end of the cylinder to move the piston therein in a direction increasing said speed, a source of fluid under pressure connected to said pressure passage, a control valve movable in the casing selectively to control the flow of fluid from said pressure passage to the other passages, a rotatably mounted flyweight in the governor driven by the output member of the transmission and connected to the control valve, said flyweight being operable to move the control valve in one direction in response to increases in speed of the output member, movement of the valve in said one direction operating to establish communication between the pressure passage and the first motor passage, a speeder spring opposing movement of the control valve in said direction and biasing the control valve toward movement in the other direction to a predetermined position establishing communication between the second motor passage and the pressure passage, and an auxiliary spring operating in series with the speeder spring for moving the control valve in said other direction and beyond said predetermined position to a different position establishing communication between the second motor passage and the drain passage.

5. The apparatus of claim 4 including a first means responsive to the pressure in one of said motor passages and movable from a first position to a second position in response to the existence therein of a predetermined pressure, means biasing said first means toward movement to said first position, a second means responsive to the pressure in the second motor passage and movable from a first position to a second position in response to the existence therein of a predetermined pressure, means biasing said second means toward movement to said first position, means for engaging the transmission to a load, and means operated in response to movement of both said fluid pressure responsive means into said second position to operate the engaging means.

References Cited in the file of this patent

UNITED STATES PATENTS

| 1,143,727 | Robson | June 22, 1915 |
| 1,260,922 | Leissner | Mar. 26, 1918 |
| 2,096,203 | Schnurle et al. | Oct. 19, 1937 |
| 2,139,194 | Lichtenstein | Dec. 6, 1938 |
| 2,270,100 | Adler et al. | Jan. 13, 1942 |
| 2,341,624 | Kieser | Feb. 15, 1944 |
| 2,572,096 | Baker | Oct. 23, 1951 |